(12) United States Patent
Baughman et al.

(10) Patent No.: US 10,674,719 B2
(45) Date of Patent: Jun. 9, 2020

(54) WILD-LIFE SURVEILLANCE AND PROTECTION

(71) Applicant: International Business Machines Corporation, Armonk, NY (US)

(72) Inventors: Aaron K. Baughman, Silver Spring, MD (US); Gary F. Diamanti, Wake Forest, NC (US); Mauro Marzorati, Lutz, FL (US); Juraj Nyiri, Ivanka pri Nitre (SK)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 15/893,886

(22) Filed: Feb. 12, 2018

(65) Prior Publication Data

US 2019/0246626 A1 Aug. 15, 2019

(51) Int. Cl.
*A01M 31/06* (2006.01)
*G05D 1/02* (2020.01)
*A01K 29/00* (2006.01)
*B64C 39/02* (2006.01)
(Continued)

(52) U.S. Cl.
CPC ........... *A01M 31/06* (2013.01); *A01K 29/005* (2013.01); *G05D 1/0202* (2013.01); *A01M 31/002* (2013.01); *B64C 39/024* (2013.01); *B64C 2201/126* (2013.01); *B64C 2201/127* (2013.01); *B64C 2201/145* (2013.01); *G06N 3/008* (2013.01); *Y10S 901/01* (2013.01)

(58) Field of Classification Search
CPC .. A01M 31/06; A01M 31/002; G05D 1/0202; G06N 3/008; Y10S 901/01; A01K 29/005; A01K 11/001; A01K 11/008; G06Q 10/0833; G06Q 10/087; G06Q 50/02; A61B 5/103; A61B 5/1112; A61B 2503/40; B64C 39/024; B64C 2201/126; B64C 2201/127; B64C 2201/145
USPC ............................................................ 701/3
See application file for complete search history.

(56) References Cited

U.S. PATENT DOCUMENTS 3,689,927 A 9/1972 Boston
5,884,427 A 3/1999 Lenz
(Continued)

FOREIGN PATENT DOCUMENTS

CN 107018362 A 8/2017
EP 2992757 B1 12/2016

OTHER PUBLICATIONS

Bruilliard, K., "These undercover robot animals are helping in the hunt for poachers," washingtonpost.com, Feb. 24, 2016, (accessed Oct. 25, 2017), pp. 1-3. https://www.washingtonpost.com/news/animalia/wp/2016/02/24/quiz-can-you-tell-a-real-deer-from-a-robo-deed?utm_term=.ea7e6941200c.
(Continued)

*Primary Examiner* — Anthony R Jimenez
(74) *Attorney, Agent, or Firm* — James L. Olsen

(57) ABSTRACT

At least two unmanned air vehicle (UAV) drones are deployed to a target location, the target location being associated with a species. At least one robot is deployed to the target location, wherein the at least one robot mimics an appearance of the species. Sensor data is collected from the at least two UAV drones. The sensor data is analyzed to determine whether a threat condition exists. In response to a determination of the threat condition, the at least one robot is repositioned to counteract the threat condition.

20 Claims, 8 Drawing Sheets

(51) Int. Cl.
G06N 3/00 (2006.01)
A01M 31/00 (2006.01)

(56) References Cited

U.S. PATENT DOCUMENTS

2010/0186280 A1* 7/2010 Dunkin ............... A01M 31/06 43/2
2017/0164603 A1* 6/2017 Kovarik ............... A01M 29/06

OTHER PUBLICATIONS

Ford et al., "PAWS: Adaptive Game-theoretic Patrolling for Wildlife Protection," AAMAS 2014 Demo Paper, International Conference on Autonomous Agents and Multi-Agent Systems, May 2014, pp. 1641-1642.
Goodyer, J., "Drone Rangers [Africa Special Sustainability]," Engineering & Technology, Jun. 2013, vol. 8, ssue 5, pp. 60-61.
Koen et al. "A framework for inferring predictive distributions of rhino poaching events through causal modelling," 2014 17th International Conference on Information Fusion (FUSION), 2014, 7 pages.
Murphy, M., "SwagBot, a new Australian robot, can herd animals on its own—Quartz," qz.com, 28 Jul. 2016, (accessed: Oct. 25, 2017), pp. 1-2. https://qz.com/744314/even-sheepdogs-arent-safe-a-new-robot-can-herd-animals-on-its-own/.
Nuwer, R., "High Above, Drones Keep Watchful Eyes on Wildlife in Africa," nytimes.com, Mar. 2017, (accessed: Oct. 25, 2017), pp. 1-5. https://www.nytimes.com/2017/03/13/science/drones-africa-poachers-wildlife.html.
Park et al., "Saving Rhinos with Predictive Analytics," Predictive Analytics, IEEE Intelligent Systems, vol. 30, ssue 4, 2015, pp. 86-88.
Snitch, T., "Drones Are Protecting Rhinos and Elephants from Poachers," slate.com, Jan. 28, 2015, (accessed: Oct. 25, 2017), pp. 1-4. http://www.slate.com/blogs/wild_things/2015/01/28/drones_for_wildlife_conservation_rangers_uays_and_math_protect_elephants.html.
Tan et al., "Embedded Human Detection System Based on Thermal and Infrared Sensors for Anti-Poaching Application," 2016 IEEE Conference on Systems, Process and Control (ICPSC 2016), pp. 37-42. DOI: 10.1109/SPC.2016.7920700.
Gady, F-S., "Drone Swarms: Flow the US Navy Plans to Fight Wars in 2016," The Diplomat, Apr. 23, 2015, pp. 1-2. https://thediplomat.com/2015/04/drone-swarms-how-the-us-navy-plans-to-fight-wars-in-2016/.
Trice, A., "Technical innovation spurred by a love for photography," IBM Passion // Project, accessed: Dec. 11, 2017, pp. 1-7. https://www.ibm.com/thought-leadership/passion-projects/smart-drone/.
"Visual Recognition," IBM Cloud Docs, Oct. 27, 2017, pp. 1-2. https://console.bluemix.net/docs/services/visual-recognition/index.html#about.
"Drone Anti-Poaching operation—Tanzania," YouTube, posted Jun. 9, 2015 by Delair, pp. 1-2. https://www.youtube.com/watch?v=OvRA8aWttq4.
"Lily Camera is a drone that follows you," YouTube, posted May 12, 2015 by IDG.tv, pp. 1-2. https://www.youtube.com/watch?v=OWrApA8oRbl.
Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

* cited by examiner

WILD-LIFE SURVEILLANCE AND PROTECTION

BACKGROUND

The present disclosure relates generally to the field of environmental protection.

Humans have a profound impact on the environment. For example, humans negatively impact the environment through pollution, habitat destruction, transfer of invasive species, and poaching. Various fauna and flora have become extinct or endangered as a direct result of human activities. Preservation and restoration of the environment is crucial to maintaining balanced ecosystems.

SUMMARY

Embodiments of the present disclosure include a method, system, and computer program product for automatically counteracting environmental threat conditions. At least two unmanned air vehicle (UAV) drones can be deployed to a target location, the target location being associated with a species. At least one robot can be deployed to the target location, wherein the at least one robot mimics an appearance of the species. Sensor data can be collected from the at least two (UAV) drones. The sensor data can be analyzed to determine whether a threat condition exists. In response to a determination of the threat condition, the at least one robot can be repositioned to counteract the threat condition.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
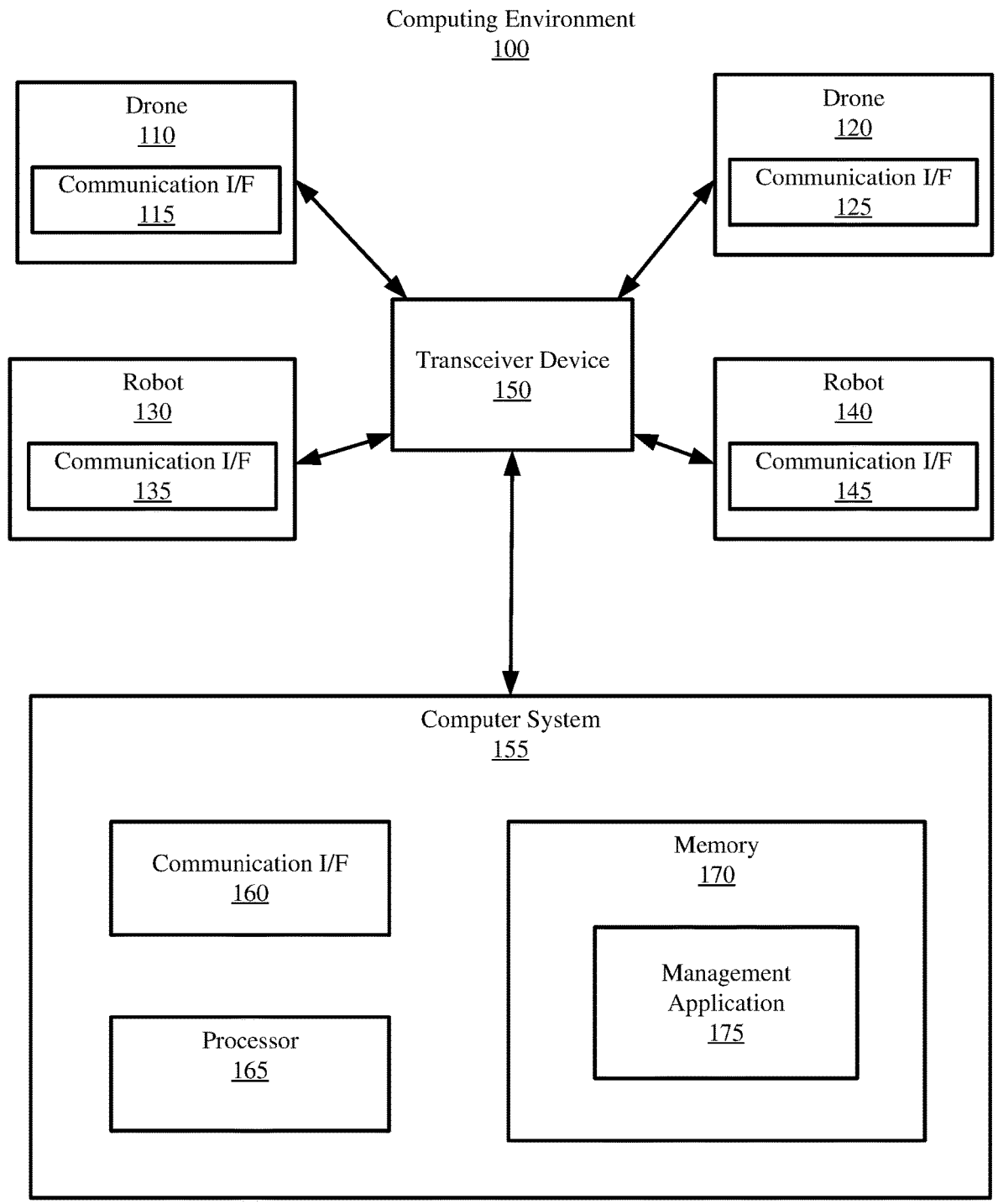
FIG. 1 is a block diagram of a computing environment in which illustrative embodiments of the present disclosure can be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of environmental protection. While the present disclosure is not necessarily limited to such applications, various aspects of the disclosure may be appreciated through a discussion of various examples using this context.

Illegal hunting and capturing of wild-life (poaching) has been a long standing and well-documented issue that has proven difficult to control and eliminate. The high demand for exotic game parts such as ivory tusks, rhino horns, and lion pelts drives a strong monetary incentive for humans to harvest these endangered species. Poaching is difficult to control due to the sheer size of areas that need oversight (e.g., the Maasai Mara Reserve in Kenya covers 583 square miles), the lack of infrastructure in these environments, and the lack of adequate staffing to monitor the resources. Accordingly, it is of great interest to provide an effective way to cover these vast wilderness areas and protect these critical resources.

Aspects of the present disclosure relate to automatically surveilling and protecting wild-life via an automatic game warden system. The automatic game warden system can include a plurality of drones and robots communicatively coupled to a computer system. The computer system first deploys the drones and robots to a target location associated with a wild-life species. The drones are configured to collect sensor data at the location associated with the wild-life species, and dispatch the sensor data to the computer system. The computer system is configured to analyze the sensor data collected by the drones to determine whether a threat condition exists. In some embodiments, the threat condition is determined to exist based on the analyzed sensor data exceeding one or more pre-defined thresholds (e.g., image recognition thresholds). If a determination is made that a threat condition exists, the computer system can issue a reconfiguration action to the drones and/or robots to counteract (e.g., deter, distract, identify details of, combat, resist, etc.) the threat condition. In some embodiments, the robots can be biomimetic, such that they mimic the appearance of the surveilled wild-life. This can be used to draw potential threats away from the protected wild-life or herd the protected wild-life away from the potential threats.

Embodiments of the present disclosure provide a method to effectively cover vast wilderness areas to surveil and protect wild-life resources. Covering vast areas of land may not be economically feasible or even possible for humans. Accordingly, utilizing drone technology may enable coverage of the vast areas of land without the need for human presence. Further, by using an automatic game warden, the monotonous task of patrolling immense areas of land is avoided. Additionally, preservation of wild-life is attained without exposing human life to danger.

Referring now to the figures, FIG. 1 depicts a computing environment 100 in which embodiments of the present disclosure can be implemented. Computing environment 100 includes a first and second drone 110 and 120 (collectively referred to as "drones 110 and 120"), a first and second robot 130 and 140 (collectively referred to as "robots 130 and 140"), at least one computer system 155, and a transceiver device 150.

Consistent with various embodiments, the computer system 155 includes a communication interface (I/F) 160, a processor 165, and memory 170. The drones 110 and 120, robots 130 and 140, and computer system 155 are configured to communicate with each other through internal or external communication I/F's 115, 125, 135, 145, and 160. The communication interfaces I/F's 115, 125, 135, 145, and 160 are, in some embodiments, radio transceivers, satellite transceivers, modems, or network interface cards. The drones 110 and 120, robots 130 and 140, and computer system 155 can be distant from each other and communicate via a transceiver device 150. In some embodiments, the transceiver device 150 is a radio transceiver used to relay information between the components in the system via the communication interfaces. In some embodiments, the transceiver device 150 is a satellite transceiver (or alternatively a satellite transponder), which can similarly be used to relay information between the drones 110 and 120, robots 130 and 140, and computer system 155.

In some embodiments, the computer system 155 can be a central hub from which drones 110 and 120 and robots 130 and 140 can establish a communication connection, such as in a client-server model (e.g., by utilizing the transceiver device 150). Alternatively, the computer system 155, drones 110 and 120, and robots 130 and 140 can be configured in any other suitable communication relationship (e.g., in a peer-to-peer (P2P) configuration or using any other communication topology).

Consistent with various embodiments, the drones 110 and 120 and robots 130 and 140 can be computer systems. For example, the drones 110 and 120 and robots 130 and 140 can include processors, memory, peripheral devices, and the like. The drones 110 and 120 and robots 130 and 140 can be configured to receive transmissions from the computer system 155 or each other through the transceiver device 150. Though FIG. 1 depicts the computing environment 100 with two drones, two robots, and one computer system, any suitable number of drones, robots, or computer systems can be implemented.

The drones 110 and 120 can include various additional components. For example, the drones 110 can include batteries, Global Positioning System (GPS) modules, cameras, radiofrequency modules, optical sensors, audio sensors, microphones, motors, accelerometers, Inferred (IR) sensors, tilt sensors, inertial sensors, current sensors, collision sensors, magnetic sensors, or other components well-known and conventional in the art. The drones 110 and 120 can be implemented in unmanned air vehicles (UAV's). For example, the drones can be multi-rotor (e.g., quad-copters), fixed-wing (e.g., planes), single-rotor (e.g., helicopters), or fixed-wing hybrid UAV's. In some embodiments, the drones 110 and 120 can be land or water mobile units. However, it is noted that any other suitable components can be included in the drones 110 and 120. Further, the drones 110 and 120 mobility can be configured in any other manner, and may depend on specific applications.

The computer system 155 includes a game warden management application 175 which is configured to surveil and protect one or more wild-life species (e.g., lions, elephants, leopards, etc.) by using the drones 110 and 120 and robots 130 and 140. The game warden management application 175 can collect sensor data from the drones 110 and 120 and/or robots 130 and 140 and issue actions to the drones 110 and 120 and/or robots 130 and 140 based on the observed sensor data.

The drones 110 and 120 can be configured to surveil a target location (e.g., the location of the wild-life species, which can be dynamic). To do so, the drones 110 and 120 can capture data via a variety of sensors (e.g., video cameras, IR sensors, audio sensors, etc.) and relay the sensor data to the computer system 155. The robots 130 and 140 can be configured to counteract (e.g., deflect, distract, monitor, combat, etc.) detected threat conditions. For example, the robots 130 and 140 can be configured to appear substantially similar (e.g., include similar features, such as limbs, skin/fur color, ear shape, size, etc.) to the monitored wild-life, and can be used to counteract (e.g., deter or distract) the poachers in response to a threat condition indication. By mimicking the protected species, the robots 130 and 140 can be used to deter or distract the poachers from their intended target (e.g., thereby acting as a phantom honeypot).

For example, in some embodiments, the robots 130 and 140 can be configured to herd the wild-life species in a direction away from the indicated threat condition. Herding the wild-life species away from the poachers can be completed in any manner. In some embodiments, herding the wild-life species can include corralling the wild-life species using a plurality of robots (e.g., by closing in on the herd and forcing the herd in a particular direction). In some embodiments, herding the wild-life species can include utilizing an animal call or other audio output to induce movement among the wild-life. In some embodiments, herding the wild-life can include using bait (e.g., food) to lead the wild-life in a particular direction. In some embodiments, herding wild-life can be completed by leading the herd via a biomimetic robot in a particular direction.

In some embodiments, the robots 130 and 140 can be configured to converge on the indicated threat such that the poachers are distracted from the surveilled wild-life. The robots 130 and 140 can appear attractive to the poachers and thus distract the poachers from the wild-life species, which may provide the wild-life enough time to escape the reach of poachers. However, the robots 130 and 140 can be configured to counteract the poachers in any manner. For example, in some embodiments, the robots 130 and 140 can be configured to organize around a perimeter of the wild-life species, such that the wild-life species is not exposed to the poachers.

The robots 130 and 140 can include various additional components. The robots 130 and 140 can include batteries, Global Positioning System (GPS) modules, cameras, radiofrequency modules, optical sensors, audio sensors, microphones, motors, accelerometers, Inferred (IR) sensors, tilt sensors, inertial sensors, current sensors, collision sensors, magnetic sensors, or other components well-known and conventional in the art. The robots 130 and 140 can be designed to appear substantially similar to the surveilled wild-life species. For example, the robots can include features (e.g., tusks, horns, fur, pelts, skin, limbs etc.) that mimic a wild-life species. Accordingly, a biomimetic robot designed to mimic an elephant can include four legs, a trunk, tusks, rough skin, big ears, etc. This can allow the robots 130 and 140 to appear indistinguishable from the surveilled wild-life, which can aid in distracting or deterring poachers. The robots 130 and 140 can include any computer programmable logic (e.g., firmware) and any actuation means (e.g., servomotors, pneumatic motors, electric motors, etc.), such that the robots produce a desired movement in response to a control signal.

The game warden management application 175 can first deploy (e.g., transmit a signal to the drones to direct their position) the drones 110 and 120 to a target location. The drones 110 and 120 can be deployed to a target location in any manner. In some embodiments, the target location can be based on tagged wild-life (e.g., Very High Frequency (VHF) Radio Transmission, Argos Doppler tags, GPS tags, etc.), and the computer system 155 can direct the drones 110 and 120 to the tagged wild-life. In some embodiments, the drones 110 and 120 can be directed to a target location based on observed visual data. In these embodiments, video data captured by the drones can be analyzed to determine the appropriate target location. For example, the drones 110 and 120 can patrol areas of land until the computer system 155 indicates a target area (e.g., based on automatic or manual visual processing). The drones 110 and 120 can be dispatched to a target location based on coordinates or GPS tags. In some embodiments, the drones 110 and 120 can be manually dispatched to a target location via user control. In some embodiments, the drones 110 and 120 can be dispatched to a target location based on audio data obtained by the drones 110 and 120 (e.g., by identifying particular audio signals). In some embodiments, the drones 110 and 120 can be dispatched to a target location based on IR sensor data. However, the drones 110 and 120 can be dispatched to a target location in any other manner otherwise consistent herein.

It is to be noted that the terminology "target location," does not necessarily have to be a fixed location. Rather, a "target location" can be dynamic, and may be fixed on a specific wild-life specimen or group of wild-life specimens (e.g., a migrating herd of bison).

Further, the game warden management application 175 is configured to position the drones 110 and 120 with respect to the target location. In some embodiments, the game warden management application 175 can be configured to position the drones 110 and 120 substantially uniformly around the target location. For example, the game warden management application 175 can be configured to synchronize a plurality of drones (e.g., tens or hundreds of drones) into a swarm at a particular altitude around the target location. In some embodiments, the positioning can depend on the target wild-life. For example, if the wild-life is noise sensitive, the drones 110 and 120 can be deployed at a higher altitude, to prevent disturbing the wild-life. In some embodiments, the initial position of the drones with respect to the surveilled target location can depend on an operating mode specified by the game warden management application 175. However, the drones can be initially positioned in any other manner otherwise consistent herein.

Further, the game warden management application 175 can be configured to deploy the robots 130 and 140 to a target location. The initial deployment and positioning of the robots 130 and 140 is, in some embodiments, orchestrated based on the drone sensor data. For example, based on the drones' determined initial position, the robots 130 and 140 can be positioned with the wild-life species. The positioning of the robots 130 and 140 with respect to the wild-life species can be determined in any manner. In some embodiments, operating modes specified by the game warden management application 175 dictate the positioning of the robots 130 and 140 among the wild-life species (e.g., within the herd). The robots 130 and 140 can be positioned within a herd, around a herd (e.g., in a perimeter surrounding the herd), in a separate group near a herd (e.g., segregated), in a direction away from the herd, etc. The particular positioning of the robots 130 and 140 with respect to the wild-life can depend on specific drone sensor data, operating modes, and/or actions issued by the computer system 155.

The drones 110 and 120 are configured to collect sensor data. The drones 110 and 120 can collect video sensor data, audio sensor data, GPS data, IR data, inertial sensor data, or any other sensor data. The video sensor data can be used to identify wild-life species, weather forecasts, threat conditions, wild-life activity, and other information surrounding the surveilled target (e.g., by automatic image recognition or manual oversight). The audio data can be used to identify wild-life species (e.g., a lion's roar), weather forecasts (e.g., thunder), and threat conditions (e.g., a motor vehicle) (e.g., by comparing observed audio data to known audio signals). The GPS data can be used to track the location and projected migration of wild-life, as well as the location and projected movement of threat conditions (e.g., poachers). In some embodiments, the inertial sensor data can be used to determine wind conditions (e.g., by determining the force exerted on the drones by the wind).

The sensor data can then be transmitted to the computer system 155 and analyzed by the game warden management application 175. The game warden management application 175 can be configured to automatically analyze the collected sensor data. In some embodiments, the game warden management application 175 can perform visual recognition (e.g., IBM Watson Visual Recognition) on frames captured via a video camera (e.g., or photo camera). In some embodiments, the game warden management application 175 can perform audio recognition (e.g., audio animal identification recognition, speech to text conversion, etc.) for audio sensor data. Further, the game warden management application 175 can be configured to extrapolate migration patterns and projected threat condition movement based on the GPS sensor data. However, the game warden management application 175 can be configured to analyze any other collected sensor data (e.g., inertial data, humidity data, etc.).

Based on the analyzed sensor data, the game warden management application 175 is configured to issue actions to the drones 110 and 120 and robots 130 and 140. The game warden management application 175 can be configured to reposition the drones 110 and 120 and/or robots 130 and 140 based on the analyzed sensor data. In some embodiments, the game warden management application 175 can issue operating modes based on the analyzed sensor data. The operating modes can dictate a subset of operations which specify specific drone/robot actions and threat condition thresholds.

The actions issued by the game warden management application 175 can be implemented to counteract an immediate threat to the surveilled wild-life species. For example, in some embodiments, in response to a determination of a threat condition, the drones 110 and 120 are issued to collect and transmit high resolution data. The high-resolution data can be used to identify the poacher(s), identify vehicle(s) associated with the poachers (e.g., license plate, model, make, etc.), and identify a location of the poachers. In some embodiments, the robots 130 and 140 are repositioned with respect to the wild-life species and identified threat condition. The robots 130 and 140 can be configured to herd (e.g., move the wild-life in a particular direct) the wild-life away from the poachers. Further, the robots 130 and 140 can be configured to move towards the poachers to distract the poachers. In some embodiments, the robots 130 and 140 can be used to draw the poachers in a direction away from the wild-life species. However, the actions issued by the game warden management application 175 to counteract the indicated threat can vary.

While FIG. 1 illustrates a computing environment 100 with a single computer system 155, two drones 110 and 120, and two robots 130 and 140, suitable computing environments for implementing embodiments of this disclosure can include any number of computer systems, drones, or robots. The various models, modules, systems, and components illustrated in FIG. 1 can exist, if at all, across a plurality of storage nodes and devices. For example, some embodiments can include two transceiver devices. The two transceiver devices can be implemented to extend the signal range between the computer system 155, drones 110 and 120, and robots 130 and 140.

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary.

Figure 2:
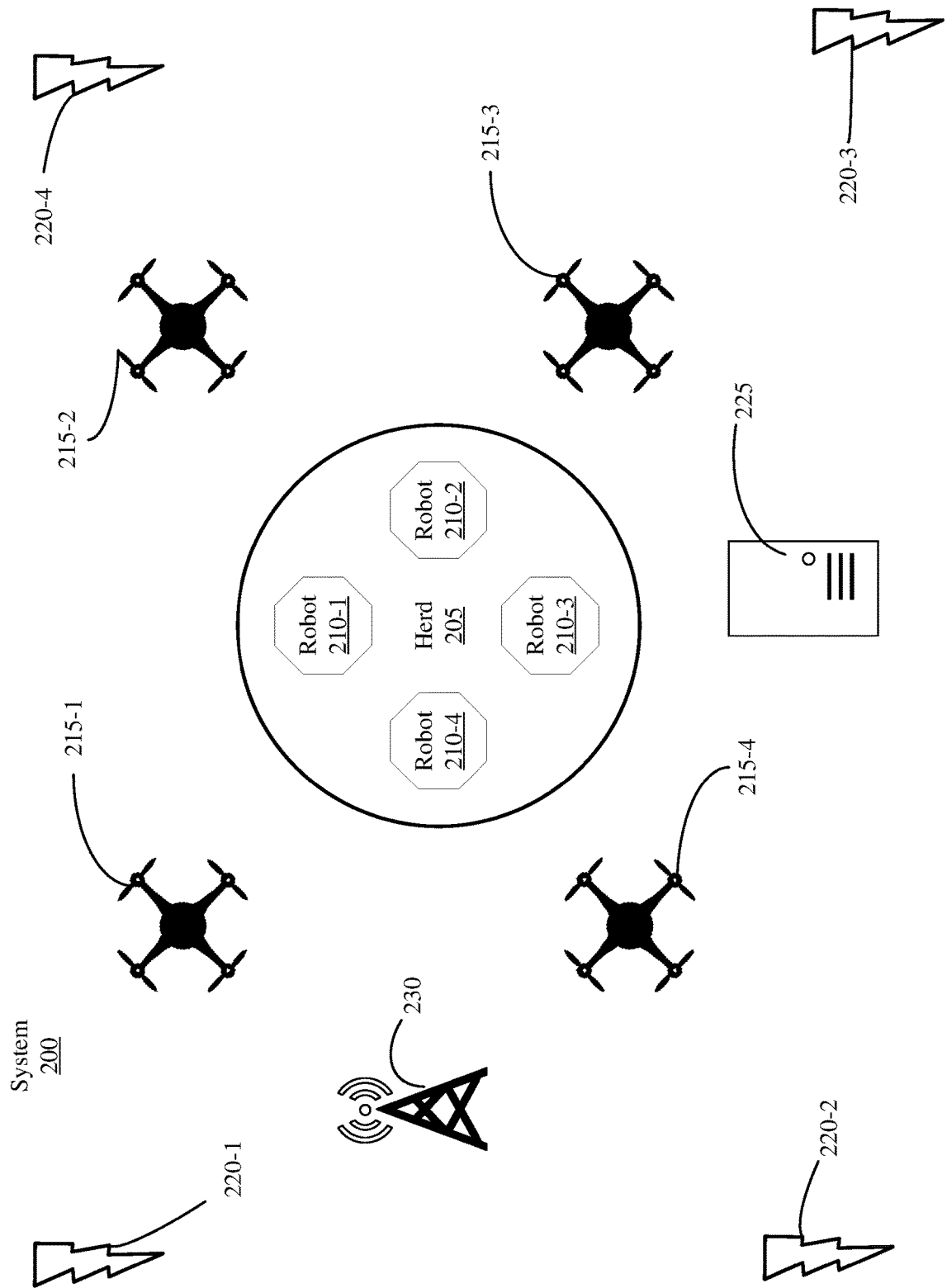
FIG. 2 is a high-level diagram of a game warden system, in accordance with embodiments of the present disclosure.

FIG. 2 is a high-level diagram of a game warden system 200, in accordance with embodiments of the present disclosure. The game warden system 200 includes a plurality of drones 215-1, 215-2, 215-3, 215-4 (herein collectively drones 215), a computer system 225, a plurality of robots 210-1, 210-2, 210-3, and 210-4 (herein collectively robots 210), a radio tower 230, and a plurality of charging stations 220-1, 220-2, 220-3, and 220-4 (herein collectively charging stations 220).

Consistent with aspects of the present disclosure, the computer system 225 can be configured to communicate with the robots 210 and drones 215 through the radio tower 230. Communication interfaces (e.g., transceivers) included in each of the robots 210, drones 215, and computer system 225 enable signals to be transmitted via the radio tower 230. Though a radio tower 230 is depicted in FIG. 2, any other suitable communication method can be implemented. For example, in some embodiments, the computer system 225 can communicate with the robots 210 and drones 215 via satellite. In some embodiments, the communication between the various components can be established through a network (e.g., intranet or internet). In some embodiments, multiple radio towers can be implemented, which can allow communication over longer ranges. However, any method of communicatively coupling the computer system 225, robots 210, and drones 215 can be implemented.

Further, any number of drones 215 and/or robots 210 can be implemented. The number of drones 215 and robots 210 can depend on the surveilled wild-life species. For example, a herd of 1,000 wildebeests may require a larger number of drones 215 and/or robots 210 than a herd of ten wildebeests. Further, the number of drones 215 and robots 210 can depend on the total perimeter the wild-life species covers (e.g., wild-life covering a 100 m perimeter may require less coverage than wild-life covering a 1 km perimeter). In some embodiments, the number of drones 215 and/or robots 210 can depend on the importance of the wild-life species under surveillance (e.g., the conservation status (endangered, critical, least concern)).

As depicted in FIG. 2, the game warden system 200 is actively surveilling a herd (e.g., a group of wild-life species such as lions, buffalo, zebras, elephants or rhinos). The computer system 225 initially deploys the robots 210 and drones 215. The positioning of the drones 215 and robots 210 with respect to the herd 205 can vary, and may depend on a selected operating mode (e.g., normal, precautionary, active, etc.). In some embodiments, the positioning depends on the particular wild-life species (e.g., elephants can require a greater spread versus lions) being monitored. In some embodiments, the positioning can depend on weather forecasts (e.g., as collected by humidity or visual data). For example, foggy weather may lead to a more condensed drone configuration, to improve monitoring of the herd 205. In some embodiments, the positioning of the drones 215 and robots 210 can depend on the time of day. For example, the drones can be deployed closer to the herd 205 at night in order to improve monitoring. In some embodiments, the drones include night vision capabilities to improve visibility at night.

The position of the robots 210 and drones 215 can be dynamically determined based on collected sensor data. For example, the drones 215 can collect video data and dispatch the video data to the computer system 225. The computer system 225 can then determine the perimeter and location of the herd based on the collected video data. In some embodiments, the perimeter and location of the herd can be calculated based on the height and location of the drone which transmitted the video data. For example, the height and position of the drone that captured the video can be used determine the actual perimeter of the herd to scale. In some embodiments, video data from multiple drones can be simultaneously considered when calculating the location and perimeter of the herd 205. The position of the robots 210 and drones 215 with respect to the perimeter and location of the herd 205 can then be determined. For example, if the herd 205 covers a circumference of 50 $m^2$, and the robots 210 are sought to be disposed at the outer perimeter of the herd 205, each of the robots 210-1 . . . 210-4 can be placed at a tangential points of the 50 $m^2$ circumference.

In some embodiments, the sensor data can be used for dynamic positioning (e.g., if the herd is moving). For example, if the herd 205 is migrating north at 100 m/hr, the computer system 225 can instruct the robots 210 and drones 215 to move in the same direction at the same pace. This can enable constant monitoring of the herd 205 in the event that the herd 205 is migrating.

After the robots 210 and drones 215 are positioned to surveil the herd 205, the drones 215 collect sensor data and dispatch the sensor data to the computer system 225. The sensor data can provide indications to the computer system 225 regarding whether a threat condition exists. For example, the computer system 225 can receive video data from the drones 215 and analyze the video data (e.g., using image/audio recognition techniques) to determine if a threat exists. If the computer system 225 determines that a threat exists, the computer system 225 can issue one or more actions to the drones 215 and/or robots 210. The actions can be issued to further surveil the threat, deter the threat, distract the threat, or to herd the wild-life in a particular direction.

The charging stations 220 can be disposed throughout the environment to maintain constant surveillance of the herd 205. When the drones 215 and/or robots 210 get low on battery/fuel, they can be directed (e.g., by the computer system 225) to the nearest charging station 220 to recharge. In some embodiments, upon a threshold battery charge level, a signal is automatically transmitted to the computer system 225 that includes an indication that the batter level is low. The computer system 225 can then analyze the position of the drones 215 and/or robots 210 with respect to the charging stations 220 and automatically direct the drones 215 and/or robots 210 to the nearest charging station 220. In some embodiments, the charging stations 220 can include GPS modules or radio transmitters in order for the computer system 225 to receive the location of each station.

In some embodiments, standby drones or robots can be implemented to replace the drones 215 or robots 210 that are currently recharging. By cycling out drones 215 and robots 210 with depleted batteries (e.g., batteries with no/low charge) or low fuel, constant surveillance of the herd 205 can be maintained. The standby drones and robots can be directed to a position of the particular drone or robot they are replacing. For example, if drone 215-1 is instructed to recharge at charging station 220-1, a standby drone can be directed to drone 215-1's previous position. In some embodiments, upon receipt of an indication that a drone or robot is low on battery, the computer system 225 can automatically transmit a signal to a standby drone to replace the low-battery drone or robot. Accordingly, the computer system 225 can automatically dispatch signals to direct low battery drones 215 and robots 210 to nearby charging stations, while simultaneously dispatching signals to standby drones or robots to replace the recharging drones 215 or robots 210.

The number and placement of the charging stations 220 can vary. In some embodiments, the number of charging stations depends on the number of dispatched drones 215 and/or robots 210. For example, 10 drones may only require two charging stations, while 100 drones may require 20 charging stations. In some embodiments, the number and placement of charging stations 220 depends on the area of surveilled land. For example, a larger stretch of land may require a greater number of charging stations 220 to ensure that the drones 215 and robots 210 are proximate to charging stations 220. The charging stations 220 can also be placed such that the drones 215 and robots 210 are proximate to the charging stations 220. For example, the charging stations 220 can be uniformly spaced across the surveilled land to ensure that the drones 215 and robots 210 are always within a particular distance of the charging stations 220.

In some embodiments, the charging stations 220 can be automatically repositioned by the drones 215. For example, in response to an indication that the drones 215 are a threshold distance from a particular charging station, the drones 215 and/or robots 210 can be directed to reposition the charging station to a nearer location. In some embodiments, the distance calculated between the drones 215, robots 210, and charging stations 220 is based on GPS data.

Figure 3A:
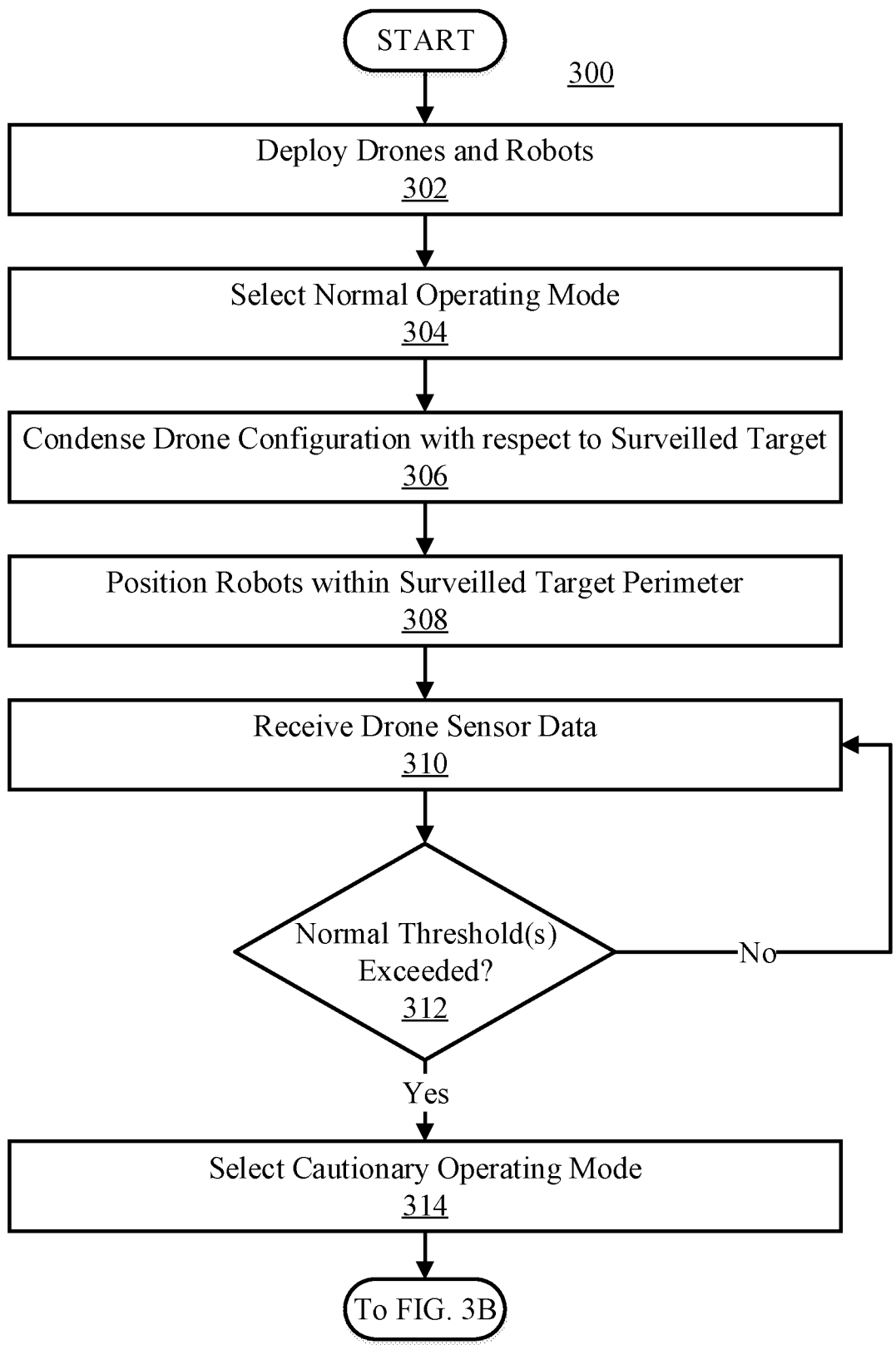
FIG. 3A, FIG. 3B, and FIG. 3C are flow-diagrams collectively illustrating a process for automatically surveilling wild-life, in accordance with embodiments of the present disclosure.
Figure 3B:
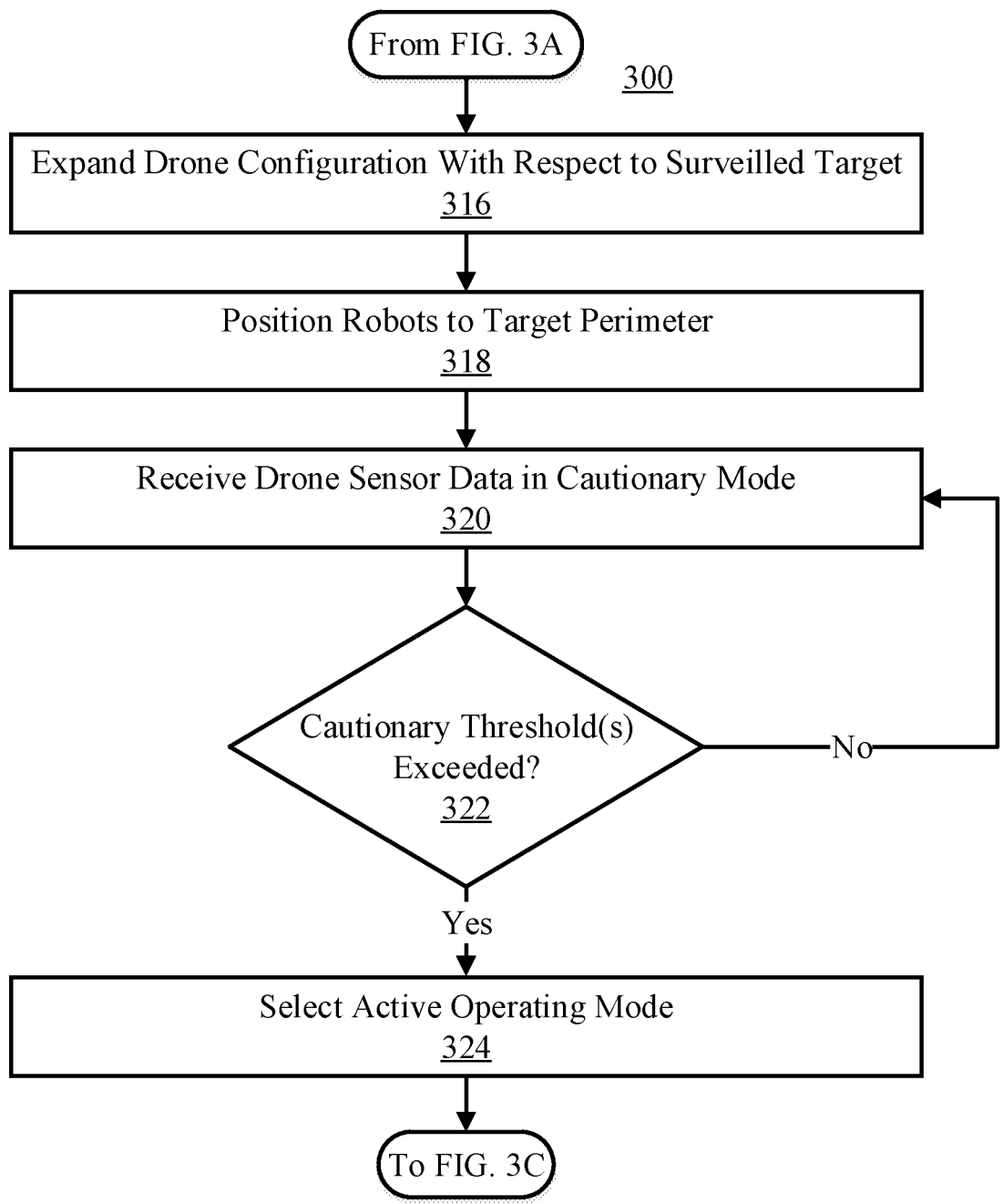
Figure 3C:
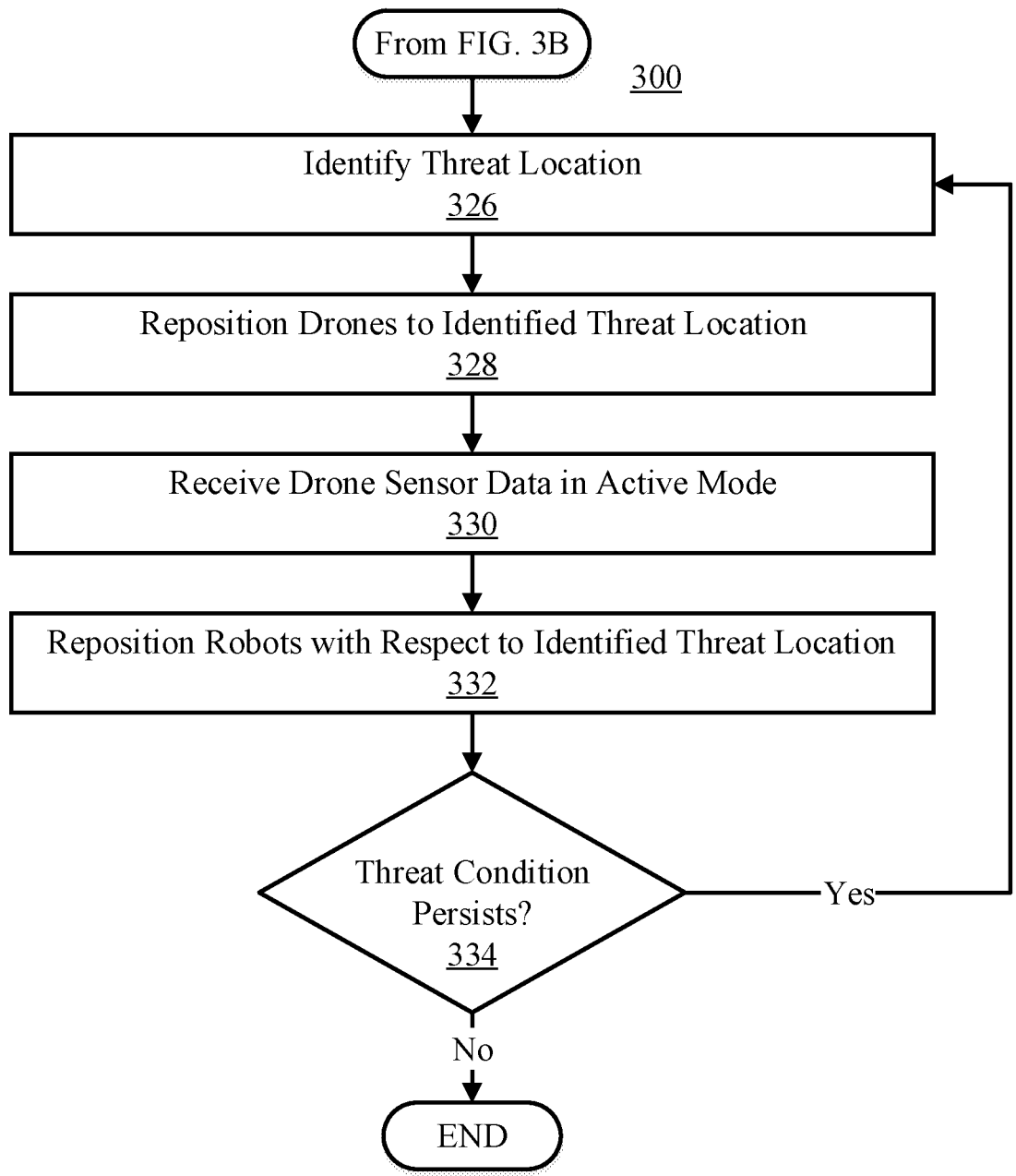

FIG. 3A, FIG. 3B, and FIG. 3C are flow-diagrams collectively illustrating a process 300 for automatically surveilling wild-life, in accordance with embodiments of the present disclosure. The connection between FIG. 3A, FIG. 3B and FIG. 3C is illustrated by reference to the preceding or following figure, respectively. Specifically, FIG. 3B is a continuation of FIG. 3A, and FIG. 3C is a continuation of FIG. 3B, all of which collectively illustrate process 300. With respect to FIGS. 3A-3C, the drones, robots, and computer system can be the same as or substantially similar to the drones (e.g., drones 110, 120 and 215), robots (e.g., robots 130, 140, and 210), and computer systems (e.g., computer system 155 and 225) discussed above with respect to FIGS. 1 and 2.

Referring now to FIG. 3A, process 300 begins at step 302, where drones and robots are deployed. The drones and robots can be automatically deployed by a computer system (e.g., computer system 155 or 225) or manually by a user. The target location the drones and robots are deployed to can be determined in any manner. In some embodiments, the target location is based on tagged wild-life (e.g., Very High Frequency (VHF) Radio Transmission, Argos Doppler tags, GPS tags, etc.). In some embodiments, the deployed location is based on sensor data obtained from the drones. For example, the drones and robots can be directed to the target location based on analyzed video data. The video data can indicate wild-life specimen or areas of interest (e.g., a water hole). In some embodiments, image recognition techniques (e.g., deep learning such as IBM Watson Image Recognition, International Business Machines Corporation AKA IBM Corp. CORPORATION NEW YORK New Orchard Road Armonk NEW YORK 10504) can be used to deploy the drones based on video sensor data.

In some embodiments, the drones and/or robots can be deployed based on GPS coordinates. For example, the drones and/or robots can be deployed to specific GPS coordinates (e.g., Latitude: −5.2489|Longitude: 39.7727). Any other sensor data can be used to deploy the drones and/or robots. For example, sensor data collected by an infrared camera can be used to deploy the drones and robots (e.g., by identifying wild-life based on thermal images). In some embodiments, audio data can be used to deploy the robots and/or drones. It should be noted that the term "target location" does not necessarily have to be fixed, and can be a dynamic location (e.g., if the target location is associated with a migrating wild-life species).

After the drones and robots are deployed, the computer system selects a normal operating mode. This is illustrated at step 304. Operating modes can be embodied in software instructions on a computer system and can specify a set of operations to be taken when a particular mode is selected. The operating modes can dictate the actions and configurations of the robots and drones. Further, the operating modes can define thresholds for determinations, such as the detection of threat conditions. Upon issuance of the normal operating mode, the computer system transmits operations specified in the normal operating mode (e.g., see steps 306-312).

In response to the normal operating mode, the drone configuration is condensed on the surveilled target the drones were initially deployed to. This is illustrated in step 306. The computer system can transmit a command to collapse the configuration of the drones proximate to the surveilled target. The relative positioning of the drones in the condensed configuration can be determined in any manner. In some embodiments, the normal operating mode can specify the spatial location of each drone with respect to the target area. For example, the normal operating mode can specify that the drones remain separated by 10 meters and hover at an altitude of 20 meters within a specified perimeter. In some embodiments, the total perimeter of the surveilled target can be determined, and the condensed configuration can be determined based on the total perimeter of the surveilled target. For example, if the normal operating mode specifies that the drones are to remain within the perimeter of the surveilled target, and the perimeter of the surveilled target is 100 m, the drones can be instructed to remain within the 100 m perimeter.

The total perimeter of the surveilled target can be determined based on wild-life GPS tags or image data captured by the drones. For example, a wild-life perimeter can be calculated based on the tagged wild-life at the outer boundaries of the herd. As another example, image data can be analyzed by the computer system in order to determine a wild-life perimeter. The computer system can identify the wild-life at the boundaries of the herd, and utilize the spatial location (e.g., height) of the drone that captured the image to determine the perimeter by scaling the perimeter of the image to the actual size.

In some embodiments, the condensed configuration in the normal operating mode can be dynamically adjusted based sensor data collected by the drones. For example, the drone configuration can depend on detected weather conditions. If the weather is foggy, humidity sensors and/or video data can indicate that the visibility is low, and can accordingly restrict the perimeter of the drones, such that they can maintain surveillance of the wild-life. For example, if video data indicates foggy weather, a determination can be made that the visibility is low, and accordingly the drones can be further condensed. In some embodiments, the configuration can be adjusted based on video data obtained from the drones (e.g., if the perimeter of the wild-life expands or contracts). In some embodiments, the configuration of the drones can depend on the sensor(s) implemented on the drones. For example, infrared camera sensors can allow expanded drone configurations as compared to video camera sensors (e.g., as infrared cameras can detect lifeforms in low visibility conditions (through fog or at night)).

In embodiments, the drone configuration can depend on the number of deployed drones. Any suitable number of drones can be implemented to surveil the wild-life. Accordingly, the position of each drone within the condensed configuration can depend on the total number of drones present. For example, the distance between drones can vary when using five drones versus 20 drones in a particular perimeter. In some embodiments, the distance between the drones can be inversely proportional to the total number of drones (e.g., if there are four times less drones, the space in between the drones can be multiplied by four).

Further, in response to the normal operating mode selection, the robots are positioned within the target location. This is illustrated at step 308. The computer system transmits a signal to the robots to direct their position within the perimeter of the wild-life (e.g., which may be determined in a manner described above). The robots can be positioned within the surveilled area such that they intermingle with the wild-life species. As described above, the robots can be biomimetic such that they appear realistic and thus are indistinguishable from the protected wild-life species. This can be implemented to distract or deter potential poachers from capturing the protected wild-life.

The robots can be positioned within the wild-life perimeter in any manner. In some embodiments, the position of each robot within the wild-life perimeter depends on the number of robots. Any number of robots can be implemented to deter or distract potential threats, and accordingly, the position of each robot can depend on the total number of robots. In embodiments, in order to attain a uniform spread within a herd, the number of robots and the perimeter of the herd can be considered when determining the position of each robot. For example, if the perimeter of a herd is a 20 m square, and there are four robots, each robot can be placed at the center point of each quadrant of the square. In some embodiments the robots can be segregated within the herd perimeter, to minimize disturbance to the wild-life. In some embodiments, the robots can be biased towards a particular direction (e.g., north or south) within the wild-life perimeter.

Drone sensor data is then received. This is illustrated at step 310. As described above, the drones can be equipped with a range of sensors and can accordingly transmit a variety of sensor data to the computer system. The sensor data can include, but is not limited to, video recordings, images, IR images (thermograms), audio data, inertial data, humidity data, and GPS data. In some embodiments, the data collection by the drones may begin upon deployment (e.g., prior to step 302). In these embodiments, the sensor data can be used to deploy and position the drones and robots.

The sensor data can be received by the computer system in any manner. In some embodiments, the sensor data is continually transmitted to the computer system in real-time (e.g., similar to first person view (FPV) drone systems). In these embodiments, the drones can continually transmit sensor data to the computer system via a radio tower, satellite, or network.

In some embodiments, the drones can transmit batches of data to the computer system. This can allow large quantities of data to be transmitted to the computer system in bursts, and can be beneficial for high resolution videos, images, audio snippets, and the like. The batch data can be received on a pull or push basis. For example, in some embodiments, the computer system can request batches of data from the drones (e.g., on a pull basis). In some embodiments, the computer system can receive batches of data as pushed by the drones. In some embodiments the batch transmissions can depend the total amount of collected data or lapsed time since the last batch. For example, data batches can be transmitted for every 1 gigabyte (GB) of data collected. Alternatively, batches can be transmitted every 10 minutes.

The batches of data can be transmitted from transmission locations. The transmission locations can be locations in which batches of data are more efficiently transferred to the computer system (e.g., locations proximate to transceiver device 150). For example, upon a batch request, the drones can be configured to travel toward a nearby radio tower or server. In some embodiments, the drones can travel directly to the computer system, such that wired connection (e.g., Ethernet or SATA) can be established between the drones and computer system. In some embodiments, the drones can be configured to travel within a Wi-Fi checkpoint or mobile "hotspot" such that the batches of data can be transferred efficiently from the drones to the computer system. In some embodiments drones can be configured to transmit batches of data using existing radio infrastructure (e.g., using 3G or 4G radio networks).

Upon receipt of the drone sensor data, the computer system analyzes the drone sensor data to determine whether normal operating mode threshold(s) are exceeded. This is illustrated at step 312. As described with respect to step 304, the normal operating mode can dictate normal operating mode threshold(s) used to identify potential threat conditions. Accordingly, the analyzed drone sensor data is compared to normal operating mode threshold(s) specified in the normal operating mode instructions.

Statistical analysis can be completed at step 312 (e.g., using kMeans or other centroid-based clustering, connectivity-based clustering, distribution-based clustering, density-based clustering, etc.) to determine features or characteristics of the sensor data. For example, the appearance of humans, hunter accessories, vehicles, and the like can be frequently associated with threat conditions, and can be useful in identifying threat conditions. Once identified and characterized, these features can be used to build models to identify future instances of threat conditions. The models may be implemented by using recursive neural networks, finite state machines, rules based on probabilistic approaches, deep learning, or other techniques. Because the models are constructed with a holistic and multi-dimensional set of data, the models can have greater ability to identify and consider previously-undiscovered or under-considered threat condition characteristics (e.g., particular wearables worn by poachers, particular hunting accessories poachers use, particular vehicles poachers use, etc.).

In embodiments, video and image data captured by the drones is received by the computer system and analyzed. The video and image data can be analyzed automatically by the computer system or manually by a user. In some embodiments, the video data is analyzed using statistically generated models (e.g., deep learning such as IBM Watson Image Recognition). The models can compare the frames of the videos (e.g., or images from a camera) to a library of pre-classified images. Based on the mapped classifications, the models can output the various classes (e.g., humans, plants, animals, etc.) the video frame or photo includes, and the match certainty to those mapped classifications. For example, if an image of a hunter with binoculars is captured and analyzed, the model can be configured to output classification match certainties such as: male: 76%, hunting: 80%, outdoor sports: 85%, binoculars: 86%, plants: 60%, based on the comparison of the image to the library of pre-classified images.

The output of the statistical models can then be compared to the normal operating mode threshold(s). In some embodiments, the normal operating mode thresholds include a plurality of classification match certainty thresholds related to poachers. As an example, the normal operating mode threshold(s) can include classifications: "Hunting", "Outdoor Sports", "Motor Vehicle", and "Human Being". Each of the classifications can have a particular match certainty threshold (e.g., 70%, 60%, 40%, 90%, respectively). In some embodiments, the analyzed image is determined to exceed the normal operating mode threshold in response to a single match certainty threshold being exceeded. For example, if the classification "Hunting" has a match certainty threshold of 50%, and an image has a match certainty of 50% or more regarding the "Hunting" classification, then the normal operating mode thresholds will be determined to be exceeded. In some embodiments, the image is determined to exceed the normal operating mode threshold(s) in response to a pre-defined number of match certainty thresholds being exceeded. For example, if there are three classification match certainty thresholds of Human: 80%, Vehicle: 70%, and Outdoor Sports: 60%, and the normal operating mode threshold(s) specify that only two of the classifications have to be exceeded in order to exceed the normal operating mode threshold(s), then if the observed match certainty for "Human" is 84%, "Vehicle" is 63%, and "Outdoor Sports" is 65%, the normal operating mode threshold will be exceeded (e.g., two of the match certainty thresholds are exceeded).

In some embodiments, each individual classification match certainty threshold must be exceeded in order to exceed the normal operating mode threshold (e.g., following the example above, the normal operating mode threshold is only exceeded if the observed classifications are as follows: Human>80%, Vehicle>70% and Outdoor Sports>60%). However, any number of classification match certainty thresholds can be defined in the normal operating mode thresholds.

The match certainty classifications defined in the normal operating mode threshold(s) can be determined based on the classifications images of poachers are likely to belong to. For example, the classifications implemented into thresholds can include classes such as: hunting, outdoor sports, Humvee, motor vehicle, camouflage, human, etc. In some embodiments, the classifications may be selected based on classifications already defined by the models used to identify poachers. In some embodiments, the models can be trained with images of poachers to improve the identification of poachers in the collected sensor data. Training the statistical models with images of known threat conditions (e.g., poachers) can improve the selection of classifications to be implemented into thresholds. For example, if a particular classification (e.g., "Hunting") is commonly associated with images of poachers, the classification can be selected to be used for thresholds.

In some embodiments, audio data can be analyzed to determine if the normal operating mode threshold(s) are exceeded. For example, audio recognition methods can be used to determine if a threat condition exists (e.g., if the normal operating mode threshold is exceeded). The audio recognition techniques can similarly utilize statistically generated models (e.g., machine learning models) to determine if the audio sensor data corresponds to pre-classified audio data. Specifically, in these embodiments, audio data can be analyzed to identify possible matches to humans, vehicles, or any other audio data relating to poaching activity. The normal operating mode thresholds can define various classification match thresholds (e.g., Vehicle 50%, Human: 70%, etc.). Based on the comparison between the analyzed audio data match certainty and the one or more audio match certainty thresholds, a determination can be made whether the normal operating mode threshold is exceeded.

In some embodiments, infrared (IR) image data is analyzed to determine whether a normal operating mode threshold is exceeded. Infrared images (thermograms) indicate the amount of thermal emission (e.g., which can be converted to temperature) of objects captured in the thermogram. In some embodiments, the infrared image data can be analyzed to determine whether the amount of emitted infrared energy exceeds predefined infrared energy emission thresholds defined in the normal operating mode thresholds. Accordingly, the observed thermal emission captured by the drones can be compared to thermal emission thresholds to determine whether a threat condition exists. As an example, if the normal operating mode threshold specifies a thermogram temperature threshold of 30° C., and the image captured by the drone includes a measured temperature of 35° C., the normal operation mode threshold can be determined to be exceeded.

However, in some embodiments, in response to determining that a temperature or thermal emission threshold is exceeded, a determination can be made that the object in the thermogram is a lifeform. In response to a determination that the object in the thermogram is a lifeform, a determination can be made whether the lifeform is a human. To determine whether the lifeform is a human, a human shape match certainty can be determined and compared to a human shape match certainty threshold. Following the example above, the shape of the 35° C. temperature lifeform can first be determined. In some embodiments, the shape is determined based on a difference between temperature levels throughout the thermogram (e.g., the 35° C. temperature drops to 10° C. at a particular point of the thermogram, the 10° C. area can be determined to not be a portion of the object). In some embodiments the shape is determined based on the colors present in the thermogram (e.g., yellow-red colors dictate warm objects, and green-blue colors depict the background). In some embodiments, the shape can be determined based on the contrast in the thermogram (e.g., lighter colors vs. darker colors can be used to distinguish object shape).

Once the object shape is determined, the shape can be analyzed to determine a human match certainty (e.g., a confidence estimate that the object in the image is a human). Analyzation of the object shape can include comparing the object shape to pre-classified object shapes using statistically generated models (e.g., deep learning algorithms, recursive neural networks, etc.). Specifically, the models can compare the object to pre-classified human shapes to determine a human match certainty. If the object exceeds a pre-defined human shape match certainty threshold, the normal operating mode threshold can be determined to be exceeded. It is to be noted that any numerical ranges can be defined in the infrared data thresholds (e.g., temperatures, percentages, decimals, etc.). Further, any number and/or type of thresholds (e.g., temperature thresholds, shape match certainty thresholds, etc.) can be implemented.

Multiple thresholds can be collectively considered in the normal operating mode thresholds. For example, image classification match certainty thresholds, audio match certainty thresholds, and thermal image temperature thresholds can all be simultaneously considered in the normal operating mode thresholds.

In some embodiments, in response to a determination that the normal operating mode threshold is exceeded, additional data can be collected. For example, if the normal operating mode threshold is exceeded, GPS data can be collected from the drone(s) that provided the data leading to the threshold breech. This can be used to identify the location of the potential threat. In some embodiments, high definition collection can be issued in response to the normal operating mode threshold being exceeded. For example, the resolution of the captured video data can be increased (e.g., from 1080p to 2160p). The high-resolution data can be transmitted in real time if possible, or rather can be transferred in a batch at a later time.

If a determination is made that the normal operating mode threshold is exceeded, then process 300 proceeds to step 314, where the cautionary operating mode is selected. If the normal operating mode threshold is not exceeded, then process 300 returns back to step 310, wherein drone sensor data is received.

Selecting the cautionary operating mode at step 314 redefines the subset of normal operating mode instructions previously selected. Accordingly, the actions and configuration of the drones and/or robots are reconfigured based on the instructions defined in the cautionary operating mode. The cautionary operating mode may be initiated to verify that the potential threat condition indicated in the normal operating mode is an actual threat condition. For example, the cautionary operating mode can "double check" the normal operating mode indications with heightened scrutiny to ensure that the detected threat condition is actually a threat (e.g., as opposed to a false alarm).

Referring now to FIG. 3B, the drone configuration with respect to the surveilled target is expanded based on the selection of the cautionary operating mode at step 314. This is illustrated at step 316. Expanding the drone configuration can allow the drones to detect sensor data from additional locations. By increasing the range the drones collect sensor data from, potential threats can be more easily identified. For example, increasing the range at which sensor data is collected can capture threat conditions which were not apparent in a condensed configuration.

The drone configuration can be expanded in any manner. In some embodiments, the drone configuration is expanded based on the previously selected configuration. For example, the perimeter the drones were previously covering could be multiplied by a particular factor (e.g., the coverage perimeter could be doubled, tripled, etc.). In some embodiments, the drone configuration can be expanded based on a location of the potential threat indication. Specifically, the drone coverage could be expanded to encompass the location of the potential threat indication that exceeded the normal operating mode threshold. For example, if video data including a motor vehicle exceeded the normal operating mode threshold, the location of the motor vehicle could be determined (e.g., based on the video data or GPS data) and the drone configuration could be expanded to cover the location of the motor vehicle.

Further, the robots can also be repositioned in response to selecting the cautionary operating mode (which can occur prior to, at the same time as, or after step 316). This is illustrated at step 318. In some embodiments, the robots can be placed at the perimeter of the wild-life species. This can ensure that the wild-life is not exposed to the potential threat. Moving the robots to the perimeter of the wild-life can be based on a calculated perimeter the wild-life encompasses (e.g., as described above). In embodiments, the robots can be repositioned to a larger perimeter than the perimeter the wild-life covers in order to ensure the wild-life is within the boundary of the robots. In some embodiments, the Drone sensor data is then received in the cautionary mode. This is illustrated at step 320. The drone sensor data can be received in a similar manner to step 310 (e.g., in real-time or batches). Further, the drone sensor data received at step 320 can include the same types of sensor data as in step 310 (e.g., video data, audio data, infrared images, GPS data, etc.). The drone sensor data in the cautionary mode covers a larger area of land than the sensor data collected in the normal operating mode. Accordingly, the drone sensor data in the cautionary mode may provide an indication of a threat condition that was not observable in the normal operating mode.

The drone sensor data received in the cautionary mode is then analyzed and a determination is made whether cautionary operating mode threshold(s) are exceeded. This is illustrated at step 322. Determining whether cautionary operating mode threshold(s) are exceeded can be completed in a manner similar to determining whether normal operating mode threshold(s) are exceeded at step 312 (e.g., comparison between analyzed data and defined thresholds). However, the cautionary operating mode thresholds can differ from the normal operating mode thresholds. In some embodiments, the cautionary operating mode thresholds are heightened compared to the normal operating mode thresholds, to improve the confidence of an indication of the threat condition.

For example, if an image match certainty threshold for the classification "Hunter" was defined as 60% in the normal operating mode thresholds, the match certainty threshold for the classification "Hunter" in the cautionary operating mode can be higher (e.g., 70%) in comparison, to improve the confidence that the observed entity is actually a hunter. In some embodiments, the cautionary operating mode thresholds are obtained by merely increasing the threshold for each of the thresholds defined in the normal operating mode thresholds. For example, in some embodiments, each of the thresholds included in the normal operating mode thresholds can be increased by a certain percentage (e.g., 10%).

In some embodiments, the number of thresholds defined in the cautionary operating mode thresholds can differ from the number of thresholds defined in the normal operating mode thresholds. For example, additional classification match certainty thresholds can be included in the cautionary operating mode thresholds (e.g., if the normal operating mode thresholds includes the classification match certainty thresholds: Hunting: 60% and Outdoor Sports: 70%, the cautionary operating mode thresholds can include: Hunting: 60%, Outdoor Sports: 70%, and Human: 70%) for image analysis. Additional thresholds can ensure that multiple criteria are met prior to making a determination, which can improve the confidence of the threat condition indication.

Multiple thresholds can be collectively considered in the cautionary operating mode thresholds. For example, image classification match certainty thresholds, audio match certainty thresholds, and thermal image temperature thresholds can all be simultaneously considered in the cautionary operating mode thresholds.

If a determination is made that the cautionary threshold(s) are exceeded, the active operating mode is selected. This is illustrated at step 324. If a determination is made that the cautionary threshold(s) are not exceeded, process 300 returns back to step 320, where drone sensor data is collected in the cautionary mode.

Selecting the active operating mode at step 324 redefines the subset of normal operating mode instructions previously selected. Accordingly, the actions and configuration of the drones and/or robots are reconfigured based on the instructions defined in the active operating mode. Upon initiation of the active operating mode, a threat condition is presumed based on the normal and cautionary operating mode thresholds being exceeded.

Referring now to FIG. 3C, based on the selection of the active operating mode at step 324, a location of the threat is identified. This is illustrated at step 326. The location of the threat can be determined based on collected drone sensor data. For example, the sensor data that exceeded the normal and/or cautionary operating mode thresholds can be further analyzed to determine a location associated with the threat. If video sensor data exceeded the normal and cautionary operating mode thresholds, a location associated with the frame(s) of the video that exceeded the thresholds can be determined. In some embodiments, the location is determined by using GPS data. GPS data collected from the drone that captured the video could be analyzed to determine the particular location of the threat condition (e.g., by estimating the distance between the drone and the threat condition captured in the video). In some embodiments, the GPS coordinates associated with the drone that captured the sensor data which breeched the thresholds can be identified as the threat location. In some embodiments, a direction of the threat indication can be determined rather than GPS coordinates. For example, if the sensor data that exceeded the thresholds is east of a particular drone, the identified threat location can be determined to be east.

After a location of the threat is identified, the drones are repositioned with respect to the location associated with the threat. This is illustrated at step 328. In some embodiments, the drones are deployed to GPS coordinates associated with the threat condition. In some embodiments, the drones are deployed in a particular direction for a particular displacement (e.g., 50 meters north) as indicated by the identified threat location. However, the drones can be repositioned to the location identified with the threat condition in any other manner. For example, in some embodiments, the drones can remain stationary as the threat condition could be located with the surveilled wild-life (or converging on the wild-life).

Any number of drones can be repositioned to the threat location. In some embodiments, only the drone(s) that captured the sensor data that exceeded the thresholds (e.g., the normal and/or cautionary operating mode thresholds) are repositioned to the threat location. This can ensure that surveillance of the wild-life is maintained by only relocating a few number of drones. In some embodiments, a certain percentage of the total drone swam is repositioned to the threat location. Transmitting a plurality of drones to the threat location can enable multiple viewing angles of the threat. This can allow more sensor data associated with the threat condition to be collected. In some embodiments, all drones are repositioned to the threat location.

Drone sensor data is then received in the active mode. This is illustrated at step 330. The drone sensor data can be received in a similar manner to step 310 (e.g., in real-time or batches). Further, the drone sensor data received at step 330 can include the same types of sensor data as in step 310 (e.g., video data, audio data, infrared images, GPS data, etc.). The drone sensor data in the active mode is collected from a location associated with the threat condition. Accordingly, the drone sensor data in the active mode can provide details associated with the threat condition. For example, the drones can be configured to collect high definition data of the poachers and objects associated with the poachers (e.g., hunting accessories, vehicles, cargo, etc.). The data associated with the threat location could be used in identifying the poachers to prevent unlawful killing and capture of wild-life in the future. The drones can be configured to monitor the location of the threat closely in order to determine whether the threat condition persists or not.

The robots are repositioned with respect to the identified threat location. This is illustrated at step 332. The robots can be repositioned to counteract the identified threat. For example, in some embodiments the robots can be repositioned toward the location associated with the threat condition. This can distract the poachers from the actual wild-life and hone their focus on the robots (e.g., which can be facilitated via realistic biomimetic robots). In some embodiments, the robots can be repositioned to herd the wild-life in a direction away from the identified threat. In some embodiments, the robots can be repositioned to encompass a perimeter of the wild-life, to shield the wild-life from the potential threat. Further, the robots may be repositioned to scatter in random direction, such that the poachers are confused and thus lose track of the protected wild-life species. Accordingly, repositioning the robots to counteract the threat condition can include any one of the above-identified reconfiguration actions.

Any suitable number of robots can be repositioned. In some embodiments, only few robots are repositioned. For example, when the robots are herded away from the threat condition, only the robots required for herding may be repositioned. In some embodiments, all of the robots are repositioned to distract the threat condition. For example, if the robots are scattered to distract the poachers, all robots can be issued to travel in a random direction.

The drone sensor data received in the cautionary mode is then analyzed and a determination is made whether the threat persists. This is illustrated at step 334. Determining whether a threat condition persists can be based on the previously defined thresholds. For example, sensor data collected by the drones can be analyzed and compared to one or more thresholds defined in the normal and cautionary operating mode thresholds. In some embodiments however, addition thresholds can be defined (e.g., additional image classification match certainty thresholds or thermogram temperature thresholds). Further, in some embodiments, the thresholds defined to determine whether the threat persists can differ from the normal and/or cautionary operating mode thresholds. For example, the thresholds to determine whether a threat condition persists in the active operating mode can be heighted as compared to the normal and/or cautionary operating thresholds (e.g., raised by a certain match certainty percentage).

If a determination is made that the threat condition does not persist, process 300 ends. In some embodiments, however, a determination that the threat condition does not persist can cause process 300 to return back to steps 304 or 314, where the normal or cautionary operating modes are selected. This can resume normal and/or heighted surveillance of the wild-life in a temporal period proximate to the identification of a threat condition.

If a determination is made that the threat condition does persist, process 300 returns back to step 326, where a location associated with the threat condition is identified. This can allow dynamic reconfiguration of the components of the system in the event that the threat condition is actively moving. For example, if a determination is made that the threat condition exists, however the location of the threat condition has changed, the new location of the threat condition can be identified, and the robots and/or drones can be repositioned based on the newly identified threat location.

The aforementioned steps may be completed in any order and are not limited to those described. Additionally, some, all, or none of the aforementioned steps may be completed, while still remaining within the spirit and scope of the present disclosure. For example, in some embodiments, step 310 for receiving drone sensor data can be completed prior to deploying the drones and robots at step 302. This can be completed if the drones and/or robots are deployed based on sensor data obtained from the drones. In some embodiments, steps 306 and 308 can be interchanged, such that the robots are first positioned within a wild-life perimeter and the drones are condensed with respect to the surveilled target after the robots are positioned.

Though FIGS. 3A, 3B, and 3C collectively illustrate a process implementing operating modes which define subsets of instructions with respect to the drone and/or robot configuration, in some embodiments, there are no operating modes. For example, in some embodiments, sensor data is received from the drones and analyzed by the computer system. The computer system can then compare the analyzed sensor data to one or more thresholds to determine whether a threat condition exists. If a determination is made that a threat condition exists, the computer system can be configured to issue one or more reconfiguration actions with respect to the drones and/or robots to counteract the identified threat condition.

Figure 4:
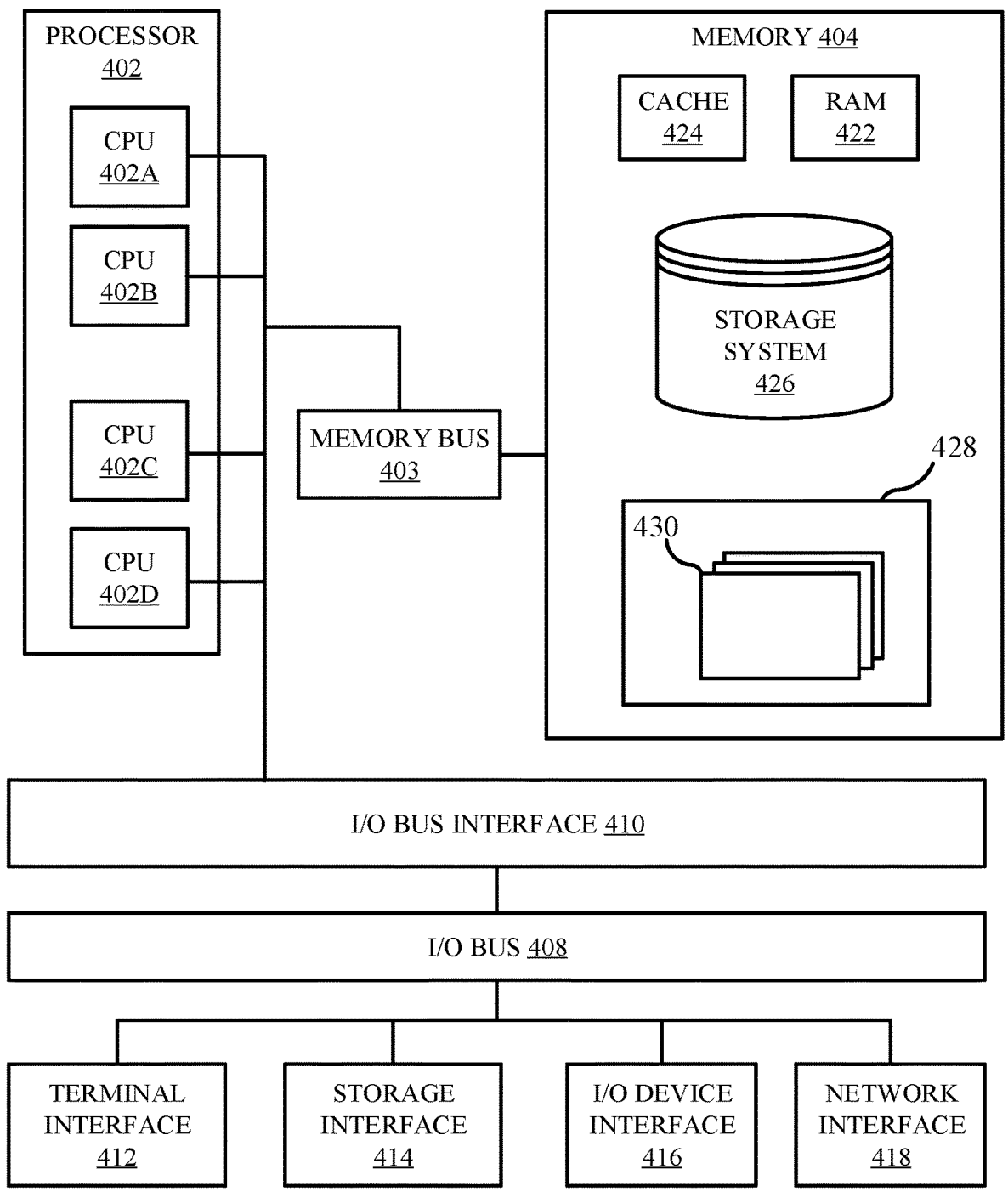
FIG. 4 is a high-level block diagram illustrating an example computer system that can be used in implementing one or more of the methods, tools, and modules, and any related functions, described herein, in accordance with embodiments of the present disclosure.

Referring now to FIG. 4, shown is a high-level block diagram of an example computer system 401 (e.g., drones 110, 120, 215, robots 130, 140, and 210, and computer systems 155 and 225) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 414, an I/O (Input/Output) device interface 416, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard-drive." Although not shown, a magnetic disk drive for reading from and writing to a removable, non-volatile magnetic disk (e.g., a "USB thumb drive" or "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

In some embodiments, the program modules 430 of the computer system 401 include a game warden management module. The game warden management module may be configured issue commands to deploy drones and/or robots to a target location (e.g., a location associated with a wild-life species). Further, the game warden management module can be configured to receive sensor data from the drones. The sensor data can then be analyzed to determine whether a threat condition exists. In response to a determination that a threat condition exists, the game warden management module can be configured to reposition the robots with respect to the wild-life species to counteract the threat condition.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
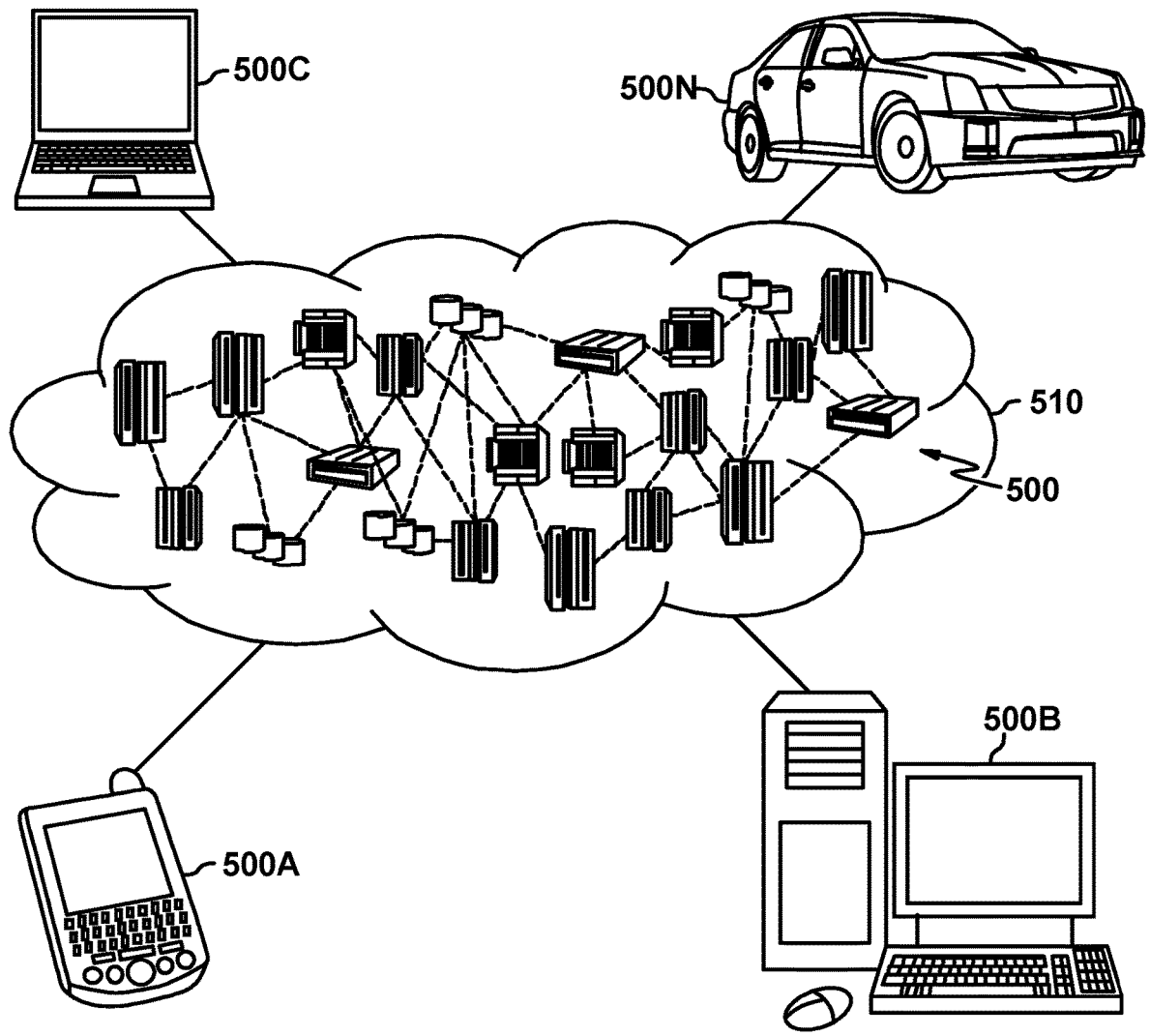
FIG. 5 is a diagram illustrating a cloud computing environment, in accordance with embodiments of the present disclosure.

Referring now to FIG. 5, illustrative cloud computing environment 510 is depicted. As shown, cloud computing environment 510 includes one or more cloud computing nodes 500 with which local computing devices used by cloud consumers, such as, for example, personal digital assistant (PDA) or cellular telephone 500A, desktop computer 500B (e.g., computer systems 155 and 225) laptop computer 500C (e.g., computer systems 155 and 225), and/or automobile computer system 500N (e.g., drones 110, 120, 215, robots 130, 140, and 210, and computer systems 155 and 225) can communicate. Nodes 500 can communicate with one another. They can be grouped (not shown) physically or virtually, in one or more networks, such as Private, Community, Public, or Hybrid clouds as described hereinabove, or a combination thereof. This allows cloud computing environment 510 to offer infrastructure, platforms and/or software as services for which a cloud consumer does not need to maintain resources on a local computing device. It is understood that the types of computing devices 500A-N shown in FIG. 5 are intended to be illustrative only and that computing nodes 500 and cloud computing environment 510 can communicate with any type of computerized device over any type of network and/or network addressable connection (e.g., using a web browser).

Figure 6:
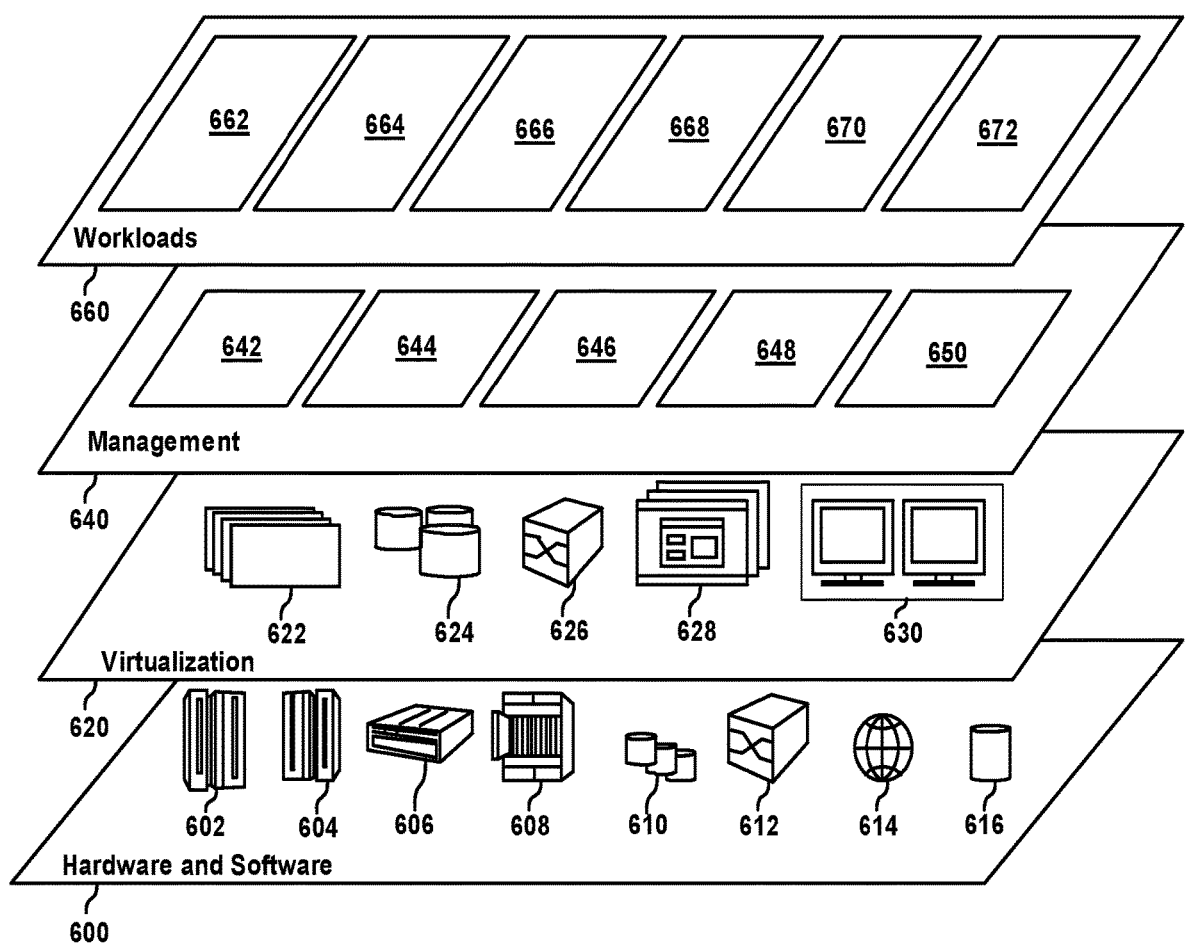
FIG. 6 is a block diagram illustrating abstraction model layers, in accordance with embodiments of the present disclosure.

Referring now to FIG. 6, a set of functional abstraction layers provided by cloud computing environment 510 (FIG. 5) is shown. It should be understood in advance that the components, layers, and functions shown in FIG. 6 are intended to be illustrative only and embodiments of the disclosure are not limited thereto. As depicted below, the following layers and corresponding functions are provided.

Hardware and software layer 600 includes hardware and software components. Examples of hardware components include: mainframes 602; RISC (Reduced Instruction Set Computer) architecture based servers 604; servers 606; blade servers 608; storage devices 610; and networks and networking components 612. In some embodiments, software components include network application server software 614 and database software 616.

Virtualization layer 620 provides an abstraction layer from which the following examples of virtual entities can be provided: virtual servers 622; virtual storage 624; virtual networks 626, including virtual private networks; virtual applications and operating systems 628; and virtual clients 630.

In one example, management layer 640 can provide the functions described below. Resource provisioning 642 provides dynamic procurement of computing resources and other resources that are utilized to perform tasks within the cloud computing environment. For example, resource provisioning 642 can allocate additional computing resources to devices (e.g., drones 110, 120, 215, robots 130, 140, and 210, and computer systems 155 and 225) which are indicated to have high activity. Metering and Pricing 644 provide cost tracking as resources are utilized within the cloud computing environment, and billing or invoicing for consumption of these resources. In one example, these resources can include application software licenses. In some embodiments, Metering and Pricing 644 indicates the number of allotted licenses to machines (e.g., drones 110, 120, 215, robots 130, 140, and 210, and computer systems 155 and 225) in the system. Security provides identity verification for cloud consumers and tasks, as well as protection for data and other resources. User portal 646 provides access to the cloud computing environment for consumers and system administrators. Service level management 648 provides cloud computing resource allocation and management such that required service levels are met. Service Level Agreement (SLA) planning and fulfillment 650 provide pre-arrangement for, and procurement of, cloud computing resources for which a future requirement is anticipated in accordance with an SLA.

Workloads layer 660 provides examples of functionality for which the cloud computing environment can be utilized. Examples of workloads and functions which can be provided from this layer include: mapping and navigation 662; software development and lifecycle management 664; virtual classroom education delivery 666; data analytics processing 668; transaction processing 670; and identifying an identifiable media 672.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A system comprising:
   at least two unmanned air vehicle (UAV) drones;
   at least one robot; and
   a computer system including at least one memory component and a processor, wherein the processor is configured to perform a method comprising:
   deploying the at least two UAV drones to a target location, the target location being associated with a species;
   deploying the at least one robot to the target location, wherein the at least one robot mimics an appearance of the species;
   collecting sensor data from the at least two UAV drones;
   analyzing the sensor data to determine whether a threat condition exists; and repositioning, in response to a determination that the threat condition exists, the at least one robot to counteract the threat condition.

2. The system of claim 1, further comprising:
identifying a location associated with the threat condition; and
collecting, in response to identifying the location associated with the threat condition, video data from a UAV drone of the at least two UAV drones at the location associated with the threat condition.

3. The system of claim 1, wherein repositioning the at least one robot to counteract the threat condition further comprises:
identifying a location associated with the threat condition; and
repositioning the at least one robot in a direction toward the location of the threat condition.

4. The system of claim 1, wherein repositioning the at least one robot to counteract the threat condition further comprises:
identifying a location associated with the threat condition; and
herding the species in a direction away from the location associated with the threat condition.

5. The system of claim 1, wherein the at least two UAV drones and at least one robot are deployed to the target location based on a Global Positioning System (GPS) tag included in each of the species.

6. The system of claim 1, wherein the sensor data is collected from a video camera, where analyzing the sensor data further comprises:
determining, using a statistically generated model, a classification of a feature of at least one frame of the sensor data collected from the video camera;
calculating a match certainty for the classification;
comparing the match certainty to a match certainty threshold; and
determining, in response to the match certainty exceeding the match certainty threshold, that the threat condition exists.

7. The system of claim 1, wherein the sensor data is collected from an infrared camera, wherein analyzing the sensor data further comprises:
determining a temperature of an object included in a thermogram of the sensor data;
comparing the temperature of the object to a temperature threshold;
determining, in response to the temperature of the object exceeding the temperature threshold, that the object is a lifeform;
determining, in response to a determination that the object is a lifeform, a shape of the object in the thermogram;
determining, using a statistically generated model, a match certainty of the shape to a human shape;
comparing the match certainty to a match certainty threshold; and
determining, in response to the match certainty exceeding the match certainty threshold, that a threat condition exists.

8. The system of claim 1, further comprising a plurality of charging stations disposed in a vicinity around the species, wherein the method further comprises:
receiving, from a UAV drone of the at least two drones, an indication of a low battery level;
determining, in response to the indication of the low battery level, a position of the UAV drone and each charging station;
identifying, based on the position of the UAV drone and each charging station, a charging station of the plurality of charging stations nearest to the UAV drone; and
deploying the UAV drone to the charging station nearest to the UAV drone.

9. A method comprising:
deploying at least two unmanned air vehicle (UAV) drones to a target location, the target location being associated with a species;
deploying at least one robot to the target location, wherein the at least one robot mimics an appearance of the species;
collecting sensor data from the at least two UAV drones;
analyzing the sensor data to determine whether a threat condition exists; and
repositioning, in response to a determination that the threat condition exists, the at least one robot to counteract the threat condition.

10. The method of claim 9, further comprising:
identifying a location associated with the threat condition; and
collecting, in response to identifying the location associated with the threat condition, video data from a UAV drone of the at least two UAV drones at the location associated with the threat condition.

11. The method of claim 9, wherein repositioning the at least one robot to counteract the threat condition further comprises:
identifying a location associated with the threat condition; and
repositioning the at least one robot in a direction toward the location of the threat condition.

12. The method of claim 9, wherein repositioning the at least one robot to counteract the threat condition further comprises:
identifying a location associated with the threat condition; and
herding the species in a direction away from the location associated with the threat condition.

13. The method of claim 9, wherein the at least two UAV drones and at least one robot are deployed to the target location based on a Global Positioning System (GPS) tag included in each of the species.

14. The method of claim 9, wherein the sensor data is collected from a video camera, wherein analyzing the sensor data further comprises:
determining, using a statistically generated model, a classification of a feature of at least one frame of the sensor data collected from the video camera;
calculating a match certainty for the classification;
comparing the match certainty to a match certainty threshold; and
determining, in response to the match certainty exceeding the match certainty threshold, that the threat condition exists.

15. The method of claim 9, further comprising:
receiving, from a UAV drone of the at least two UAV drones, an indication of a low battery level;
determining, in response to the indication of the low battery level, a position of the UAV drone and a position of each of a plurality of charging stations disposed throughout an area;
identifying, based on the position of the UAV drone and each charging station, a charging station of the plurality of charging stations nearest to the UAV drone; and
deploying the UAV drone to the charging station nearest to the UAV drone.

16. A computer program comprising a non-transitory computer readable storage medium having program instructions embodied therewith, the program instructions executable by a processor to cause the processor to perform a method comprising:
- deploying at least two UAV drones to a target location, the target location being associated with a species;
- deploying at least one robot to the target location, wherein the at least one robot mimics an appearance of the species;
- collecting sensor data from the at least two UAV drones;
- analyzing the sensor data to determine whether a threat condition exists; and
- repositioning, in response to a determination that the threat condition exists, the at least one robot to counteract the threat condition.

17. The computer program of claim 16, wherein the method further comprises:
- identifying a location associated with the threat condition; and
- collecting, in response to identifying the location associated with the threat condition, video data from a UAV drone of the at least two UAV drones at the location associated with the threat condition.

18. The computer program of claim 16, wherein repositioning the at least one robot to counteract the threat condition further comprises:
- identifying a location associated with the threat condition; and
- repositioning the at least one robot in a direction toward the location of the threat condition.

19. The computer program of claim 16, wherein the at least two UAV drones and at least one robot are deployed to the target location based on a Global Positioning System (GPS) tag included in each of the species.

20. The computer program of claim 16, wherein the sensor data is collected from a video camera, where analyzing the sensor data further comprises:
- determining, using a statistically generated model, a classification of a feature of at least one frame of the sensor data collected from the video camera;
- calculating a match certainty for the classification;
- comparing the match certainty to a match certainty threshold; and
- determining, in response to the match certainty exceeding the match certainty threshold, that the threat condition exists.

* * * * *